United States Patent
Froumajou et al.

[15] 3,673,882
[45] July 4, 1972

[54] ENGINE-DRIVE UNIT HAVING A CONVERTER AND SPEED VARIATOR

[72] Inventors: Armand Froumajou, Pontoise; Bernard Falay, Paris, both of France

[73] Assignees: Automobiles Peugeot, Paris, France; Regie Nationale des Usines Renault, Billancourt, France

[22] Filed: March 22, 1971

[21] Appl. No.: 126,406

[30] Foreign Application Priority Data

April 1, 1970   France..............................70 11 711

[52] U.S. Cl....................................................74/199
[51] Int. Cl...................................................F16h 15/08
[58] Field of Search........................................74/199

[56] References Cited

UNITED STATES PATENTS

| | | | |
|---|---|---|---|
| 3,557,636 | 1/1971 | Dangauthier | 74/199 X |
| 3,621,734 | 11/1971 | Bouthors et al. | 74/199 X |

*Primary Examiner*—Leonard H. Gerin
*Attorney*—Burns, Doane, Swecker & Mathis

[57] ABSTRACT

Engine-drive unit comprising a speed variator and a torque converter interposed between the speed variator and the engine. The speed variator includes a fluid motor for pressing the friction elements together, the friction elements being respectively connected to rotate with two shafts one of which is carried by a movable support so as to vary the distance between the shafts. The fluid motor is supplied with fluid under pressure by a supply device controlled by a valve. The valve is controlled not only by the load on the engine but also by the position of the movable support corresponding to the maximum speed reduction.

In this way the force for pressing the friction elements together is limited to the value necessary for good operation of the variator with no loss of power and no useless wear.

4 Claims, 4 Drawing Figures

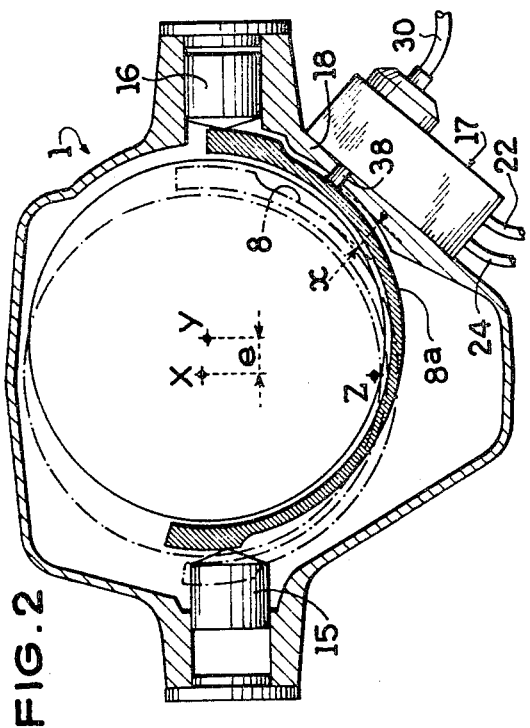
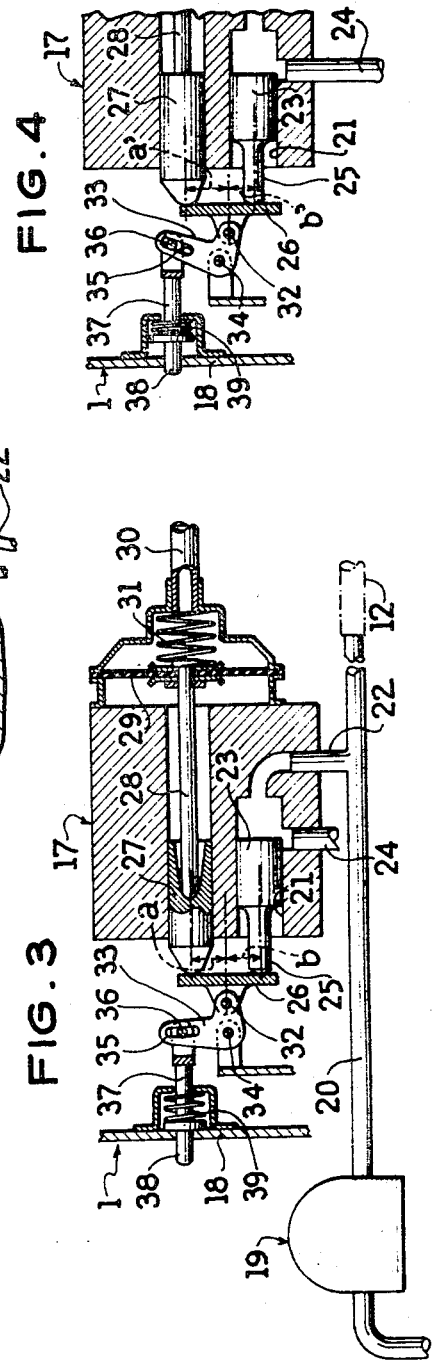

ENGINE-DRIVE UNIT HAVING A CONVERTER AND SPEED VARIATOR

The present invention relates to engine-drive units having an automatic transmission and including a converter disposed between the engine and a speed variator which has friction elements constituted by discs and rings whose axis-to-axis distance is variable and which are combined with means controlling the degree to which the discs and rings are pressed together.

In these speed variators, it is conventional to render the axial force pressing the discs and rings together proportional to the torque transmitted so as to reduce wear in the discs and rings and the power consumed in the transmission.

When the discs and rings are pressed together by hydraulic means, this condition is fulfilled by relating, by means of a valve, the pressing pressure to the load of the engine — which can be defined by the depression in the induction pipe or by the position of the accelerator pedal of the vehicle — in such manner that the pressure is roughly proportional to this load.

Unfortunately, this relationship, which is sufficient in the case of a variator directly connected to the engine, is unsuitable when there is interposed between the engine and the variator a torque converter which, when it operates as a converter and not as a coupling, increases the torque whose ratio can exceed, when the engine stalls, the value "2" and remains high when the vehicle starts to move off, that is, when the variator is in the position giving maximum speed reduction.

It is therefore necessary to take into account this ratio of the converter, otherwise the variator would no longer be able to transmit the torque and intense slipping would occur between the discs and rings.

This drawback can be overcome by increasing for the entire operational range the pressing force acting on the discs and rings so that it is sufficient when the converter produces the maximum torque increase, but this arrangement leads to increased wear and losses in efficiency whenever the converter merely acts as a coupling, which corresponds to by far the major period of its utilization.

It is also possible, for remedying this, to effect a correction by means of a parameter constituted by the speed of the engine, this correction being based on the fact that the conversion capacity of the converter is related to its input speed. However, apart from difficulties experienced in the construction of such an arrangement, this arrangement again leads to an unnecessary increase in the disc and ring pressing force in the low speed range of the engine and a consequential loss in efficiency and unnecessary wear.

The object of the invention is to provide an engine-drive unit having a converter interposed between the engine and a speed variator having friction elements which are connected to two rotary shafts whose axes are disposed a variable distance apart and which are carried by two supports one of which supports is movable, the friction elements being pressed together by a fluid motor fed with fluid under pressure by a supply device having a valve controlled by the load on the engine, said unit being so improved as to avoid the drawbacks of the aforementioned arrangement while limiting in all cases the friction element pressing force of the speed variator to the valve necessary for good operation of the variator without loss of power or unneccessary wear.

The invention provides an engine-drive unit wherein said valve of said supply device for the fluid motor of said variator is not only controlled by the load on the engine but also by the position of said movable support of said variator corresponding to maximum speed reduction.

As this maximum speed reduction corresponds, as mentioned before, to the moving off of the vehicle, that is, to the moment when the converter increases the torque, the friction element pressing force is rendered proportional to the engine torque in accordance with a ratio which is larger when the converter acts as a converter than when it acts as a simple coupling.

According to one embodiment, the moving element of the valve is connected to a movable element subjected to the action of the depression prevailing in the induction pipe of the engine and to a rod which extends inside the case of the variator under the action of a resiliently yieldable return device so as to be located in the path of said movable support of said variator in such position that it is urged back, in opposition to the action of the resiliently yieldable device, when said support is brought to the position of maximum speed reduction, to such extent that it affords the desired correction of the position of the moving element of the valve.

Preferably, the moving element of the valve and a push-rod connected to the movable element subjected to the action of the depression prevailing in the induction pipe of the engine, bear against a bar mounted to pivot about a pin carried by a lever which is adapted to pivot about a fixed axis and is connected to the rod combined with the movable support of the variator, in such manner that variation in the position of said rod brings about a variation in the ratio between the distances between the pivot pin of the bar and the points at which the moving element of the valve and the push-rod bear against the bar.

Further features and advantages of the invention will be apparent from the ensuing description with reference to the accompanying drawings.

In the drawings:

FIG. 2 is a sectional view taken along line 2—2 of FIG. 1;

Figure 1:
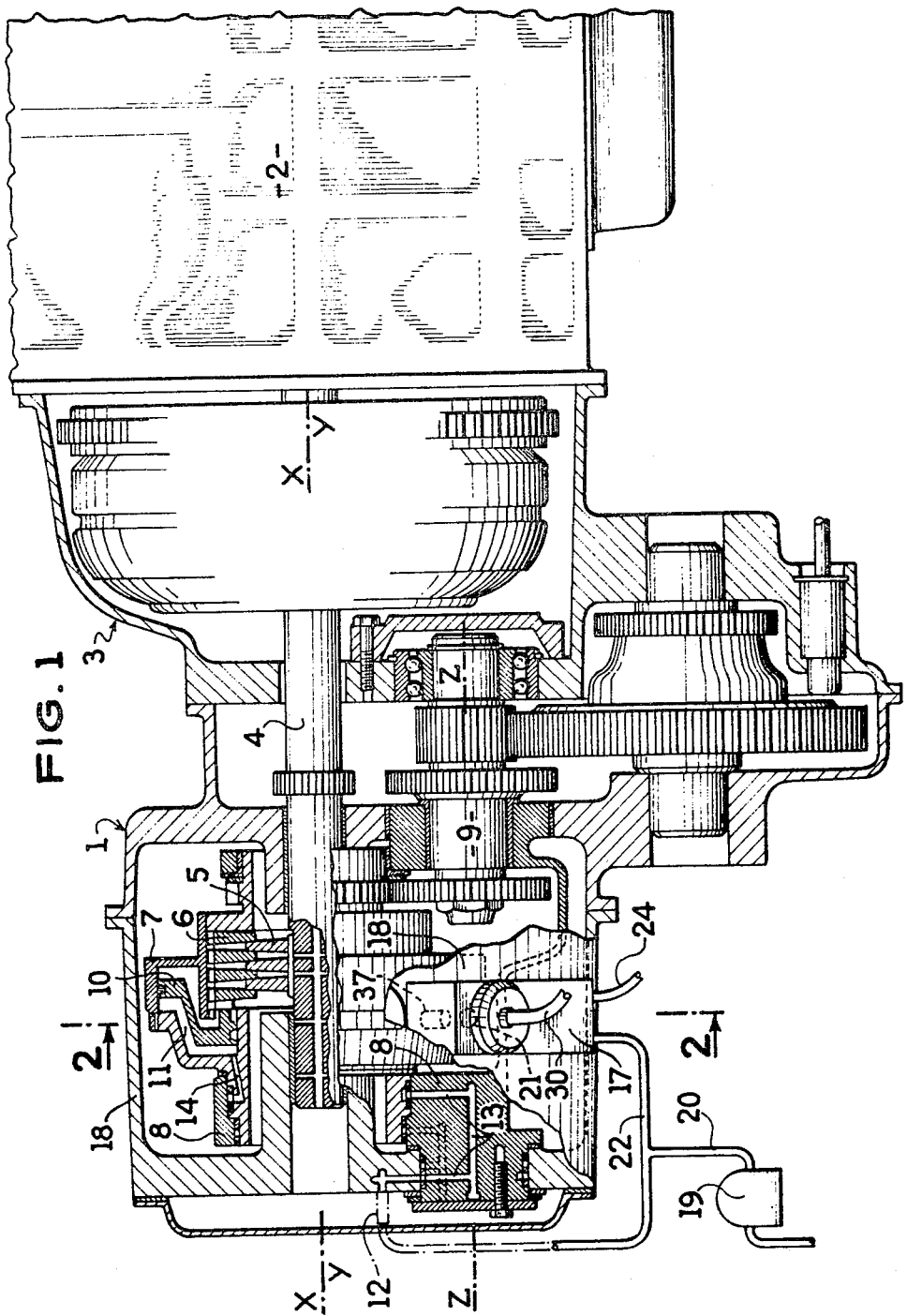
FIG. 1 is a diagrammatic view, with parts cut away, of an engine-drive unit according to the invention.

FIG. 3 is a diagrammatic sectional view of the device supplying fluid under pressure to the pressure-applying fluid motor of the variator in the normal position of operation when the converter acts as a simple coupling, and FIG. 4 is a partial sectional view showing the position assumed by the bar of the device when the push-rod which extends into the variator case is urged back by the movable support in the variator.

The invention will be described in its application to an engine-drive unit having an automatic transmission which includes a speed variator 1 of the type described in the U.S. Pat. Ser. No. 89,399 filed Nov. 13, 1970.

The variator 1 is driven by an internal combustion engine 2 through a torque converter 3.

The output shaft 4 of the converter 3 carried male discs 5 which are slidably keyed on the shaft, have an axis X—X and are interposed between female rings 6 slidably keyed in a drum 7. The latter is rotatably mounted in a movable support whereby it is possible to vary the eccentricity or offset $e$ (FIG. 2) of the axis Y—Y of the rings and drum with respect to the axis X—X. This support comprises a rocker 8 which is pivotable about an axis Z—Z coinciding with the output shaft 9 of the variator.

The discs 5 and rings 6 are pressed together by a plate 10 constituting the piston of a linear fluid motor or ram under the effect of the pressure of hydraulic fluid acting in a chamber 11 in the drum 7. The fluid under pressure is supplied to the chamber 11 by a fixed connection 12 through a passage 13 in the rocker 8 and a passage 14 in the body of the fluid motor.

Rocking the rocker 8 about the axis Z—Z modifies the distance $e$ between the discs 5 and the rings 6 and varies the speed ratio between the input shaft 4 and the output shaft 9. The rocking movement is achieved for example by the action of hydraulic fluid motors or rams 15 and 16 (FIG. 2).

A hydraulic unit 17 disposed on the side of the case of the speed variator 1 comprises a valve regulating the pressure of the liquid supplied by a pump 19 through a conduit 20 to the connection 12 connected to the chamber 11 of the fluid motor of the variator. The valve comprises a cylinder 21 which is connected to the conduit 20 and in which acts by way of a conduit 22 the pressure delivered by the pump 19 in opposition to the action of a slide valve 23 which is adapted to open to a varying extent a discharge orifice 24. This slide valve 23 terminates in a stem 25 which bears against a bar 26.

Arranged in parallel relation to the slide valve 23 is a push-rod 27 disposed between the bar 26 and a rod 28 connected to an elastically yieldable diaphragm 29 which is exposed on the side thereof opposed to the rod 28 to the depression prevailing in the induction pipe (not shown) of the engine, this pipe being connected to the connection 30. A spring 31 biases the rod 28 and the push-rod 27 against the bar 26.

The bar 26 is pivoted by a pin 32 to a crank lever 33 which is pivotably mounted on a fixed pin 34 parallel to the pin 32. The crank lever 33 is pivoted at its other end by a slot 35 and a pin 36 parallel to the pin 32 to a rod 37 which terminates in a finger portion 38 extending inside the case 18 of the variator 1. A spring 39 biases the finger portion 38 inwardly of the case.

The arrangement is such that for positions of the rocker 8 corresponding to speed reducing ratios in normal operation of the vehicle, there is a lost motion of $x$ between the rocker 8 and the finger member 38 (FIG. 2).

The engine-drive unit operates in the following manner:

For all the operational ranges for which the rocker 8 is not in position 8a, namely in its position corresponding maximum eccentricity or offset, the crank lever 33 is fixed in position and the ratio between the pressure regulated by the slide valve 23 and the depression prevailing in the induction pipe (and therefore the load of the engine) is a direct function of the ratio $a$ (FIG. 3) between the two lever arms of the bar 26 corresponding to the bearing points of the push-rod 27 and stem 25 on this bar.

On the other hand, when the rocker 8 reaches its position 8a of maximum eccentricity or offset and after having effected the lost motion $x$, it shifts the finger member 38 which pivots the crank lever 33. The pivot pin 32 of the bar 26 then moves in a direction away from the axis of the push-rod 27 and towards the axis of the slide valve 23, the movement of the pin 32 in the direction parallel to these axes being negligible.

It can be seen that the ratio between the pressure regulated by the slide valve 23 and the depression in the induction pipe of the engine is then a function of the new ratio $a'/b'$ (FIG. 4).

The arrangement is such that the product $a'/b' \times b/a$ is equal to the ratio corresponding to the maximum increase in the torque of which the converter is capable.

In this way, the variator 1 is capable of transmitting under optimum conditions the torque in all conditions of operation.

Having now described our invention what We claim and desire to secure by Letters Patent is:

1. An engine-drive unit comprising a speed variator, a torque converter interposed between the engine and said speed variator, said speed variator comprising first friction elements connected to rotate with a first rotary shaft and second friction elements connected to rotate with a second rotary shaft and interposed between said first friction elements, a first support carrying said first shaft and a second support which is movable between a first position and a second position and carries said second shaft, said shafts having axes which are disposed a distance apart which is variable by moving said second support between said positions, said second position of said second support corresponding to maximum speed reduction of said variator, a fluid motor associated with said friction elements for pressing said elements together, a supply device for supplying said fluid motor with fluid under pressure, a valve associated with said supply device for controlling the supply of said fluid to said fluid motor, first means for controlling said valve in response to the load on said engine and second means for controlling said valve in response to said second position of said second support.

2. An engine-drive unit comprising a speed variator, a torque converter interposed between the engine and said speed variator, said speed variator comprising first friction elements connected to rotate with a first rotary shaft and second friction elements connected to rotate with a second rotary shaft and interposed between said first friction elements, a first support carrying said first shaft and a second support which is movable between a first position and a second position and carries said second shaft, said shafts having axes which are disposed a distance apart which is variable by moving said second support between said positions, said second position of said second support corresponding to maximum speed reduction of said variator, a fluid motor associated with said friction elements for pressing said elements together, a supply device for supplying said fluid motor with fluid under pressure, a valve associated with said supply device for controlling the supply of said fluid to said fluid motor, said engine having an induction pipe, first means communicating with said induction pipe and responsive to the depression prevailing in said induction pipe, said speed variator comprising a case containing said second support, connecting means comprising a rod movably mounted in said case in such position relative to said second support as to be capable of being encountered by and shifted by said second support when said second support moves to said second position, resiliently yieldable means biasing said rod toward said second support, said valve having a valve adjusting element, connecting means connecting said valve adjusting element to said first means and to said connecting means, whereby variation in said depression in said induction pipe changes the position of said valve and the extent to which said second support shifts said rod is such as to achieve a correction of said position of said valve.

3. An engine-drive unit as claimed in claim 2, wherein said connecting means comprise a lever pivotable about an axis fixed relative to said case and connected to said rod so as to be pivotable by said rod, a bar pivotably connected to said lever by a pivot pin, said first means engaging said bar in a first portion of said bar on a first side of said pivot pin and said valve adjusting element engaging said bar in a second portion of said bar on a side of said pivot pin opposed to said first side of said pivot pin, so that variation in the position of said rod results in a variation in the ratio between the distance between said pivot pin and a plane containing said first means and the distance between said pivot pin and a plane containing said valve adjusting element.

4. An engine-drive unit as claimed in claim 2, wherein said second support is a rocker pivotable between said first position and said second position, the arrangement being such that said rod is encountered by said second support after a lost motion travel of said second support toward said second position.

* * * * *